United States Patent
Hellenbrand et al.

(10) Patent No.: US 10,023,396 B2
(45) Date of Patent: Jul. 17, 2018

(54) DEVICE FOR SEPARATING PIECE GOODS TO BE STORED IN AN AUTOMATED STORAGE FACILITY

(75) Inventors: Christoph Hellenbrand, Kaifenheim (DE); Uwe Furtner, Obersulm (DE); Ingo Boesnach, Waldbronn (DE); Frank Höschle, Oppenweiler (DE); Marta Carbonell Zaragoza, Stuttgart (DE)

(73) Assignee: CAREFUSION GERMANY 326 GMBH, Kelberg (DE)

( * ) Notice: Subject to any disclaimer, the term of this patent is extended or adjusted under 35 U.S.C. 154(b) by 676 days.

(21) Appl. No.: 14/124,657

(22) PCT Filed: Oct. 6, 2011
(Under 37 CFR 1.47)

(86) PCT No.: PCT/EP2011/067520
§ 371 (c)(1),
(2), (4) Date: Nov. 10, 2015

(87) PCT Pub. No.: WO2012/167846
PCT Pub. Date: Dec. 13, 2012

(65) Prior Publication Data
US 2017/0088361 A1    Mar. 30, 2017

(30) Foreign Application Priority Data
Jun. 7, 2011 (EP) ................................ 11169016

(51) Int. Cl.
*B65G 43/08* (2006.01)
*B65G 47/91* (2006.01)
*B65G 47/90* (2006.01)

(52) U.S. Cl.
CPC .......... *B65G 43/08* (2013.01); *B65G 47/905* (2013.01); *B65G 47/914* (2013.01);
(Continued)

(58) Field of Classification Search
CPC ...... B65G 43/08; B65G 43/00; B65G 47/905; B65G 47/917; B65G 47/90–47/92;
(Continued)

(56) References Cited

U.S. PATENT DOCUMENTS 6,471,044 B1   10/2002 Isaacs et al.
7,508,512 B1 * 3/2009 Rollins ................ G01B 11/272
                                                       349/139
(Continued)

FOREIGN PATENT DOCUMENTS

DE       202004015264    * 11/2004
DE          2004012133   *  4/2005
(Continued)

*Primary Examiner* — Leslie A Nicholson, III
*Assistant Examiner* — Keith R Campbell
(74) *Attorney, Agent, or Firm* — McDermott Will & Emery LLP

(57) ABSTRACT

A device for separating piece goods to be stored in an automated storage facility is provided. The device includes a conveyor for conveying piece goods from a stock to a support surface of a collecting device, a controller for controlling the conveyor, a sensor, to detect the striking of the support surface by piece goods. The detector has an imager, which produces at least one recording of the underside of the support. A handling device is configured to remove a piece good from the support surface for further transport into the storage facility is coupled to the controller, which is further configured to control the handler according to the information.

18 Claims, 2 Drawing Sheets

(52) U.S. Cl.
CPC .... *B65G 47/917* (2013.01); *B65G 2203/0225* (2013.01); *B65G 2203/0233* (2013.01); *B65G 2203/041* (2013.01)

(58) Field of Classification Search
CPC .... B65G 2203/0225; B65G 2203/0233; B65G 2203/041; B65G 2203/044
USPC ..................................... 198/395, 401, 464.4
See application file for complete search history.

(56) References Cited

U.S. PATENT DOCUMENTS

| | | | |
|---|---|---|---|
| 8,880,216 B2* | 11/2014 | Izumi ..................... | B25J 9/1697 198/395 |
| 9,498,798 B2* | 11/2016 | Hellenbrand ........... | B07C 5/362 |
| 9,653,259 B2* | 5/2017 | Scheffers ............... | G01B 11/14 |
| 2013/0021472 A1* | 1/2013 | Iwase ..................... | G01B 11/04 348/142 |
| 2016/0083199 A1* | 3/2016 | Nishizaka ............ | B65G 47/905 414/567 |
| 2017/0120302 A1* | 5/2017 | Hellenbrand ........... | B07C 5/362 |

FOREIGN PATENT DOCUMENTS

| | | |
|---|---|---|
| DE | 10 2004 012 133 | 5/2005 |
| WO | WO 08/031648 | 3/2008 |

\* cited by examiner

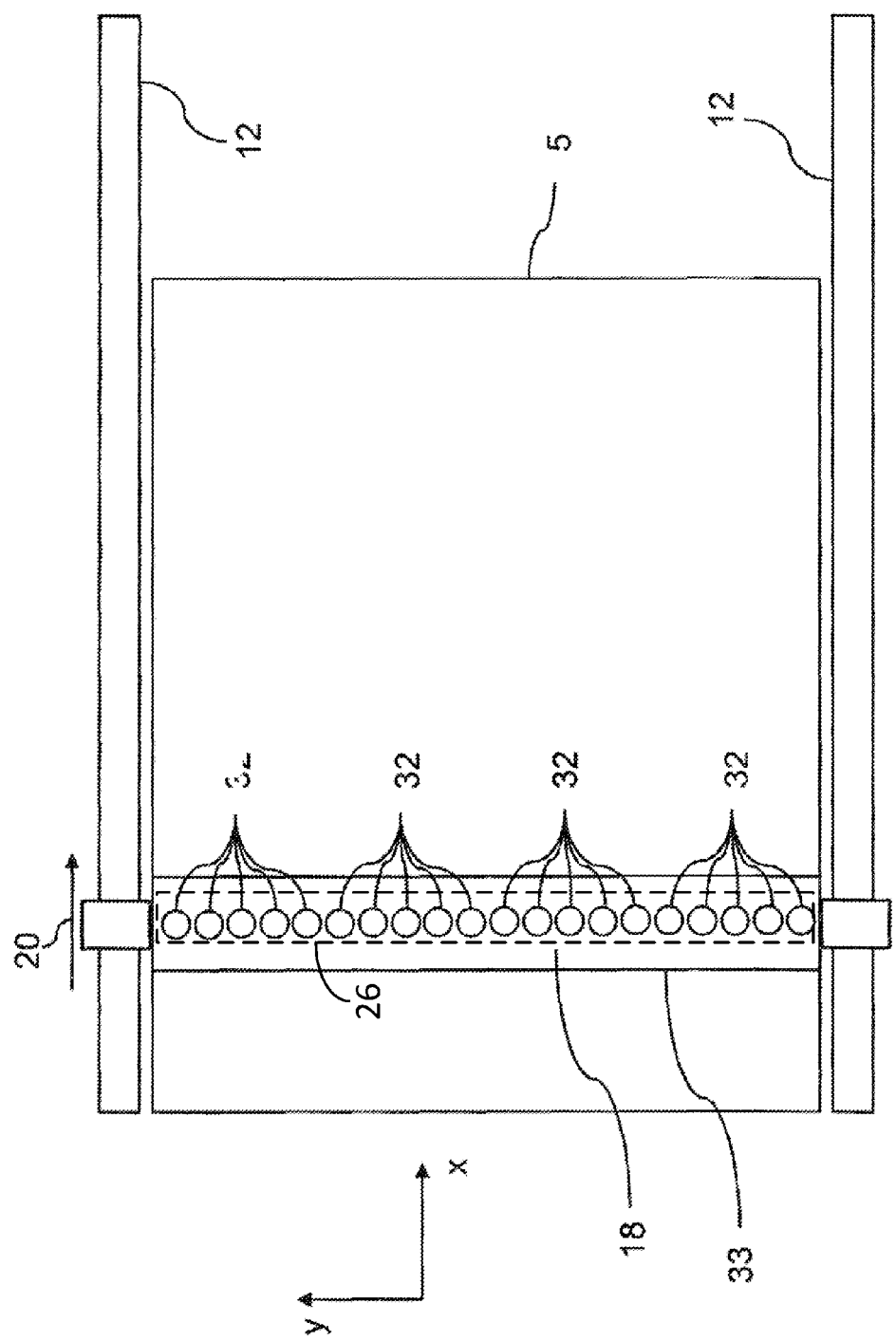

DEVICE FOR SEPARATING PIECE GOODS TO BE STORED IN AN AUTOMATED STORAGE FACILITY

CROSS-REFERENCE TO RELATED APPLICATION

This application is the U.S. National Phase under 35 U.S.C. § 371 of International Application No. PCT/EP/2011/067520, filed on Oct. 6, 2011, which claims the benefit of EP 11169016.0, filed Jun. 7, 2011. The entire contents of these applications are incorporated by reference herein.

The invention relates to a device for separating piece goods to be stored in an automated storage facility, comprising a conveying device for conveying piece goods from a stock to a support surface of a collecting device, a control device for controlling the conveying device, a sensor that is coupled to the control device and detects an impact of piece goods on the support surface, wherein the control device interrupts the conveying of additional piece goods onto the support surface as soon as the impact of a piece good or several piece goods has been detected, a detecting device that is coupled to the control device and serves for detecting the position and orientation of the piece goods lying on the support surface, wherein the detecting device features an image recording device that records at least images of the underside of the collecting device and the control device obtains information on the position and orientation of the piece goods lying on the collecting device from said images, and a handling device that is coupled to the control device and serves for removing a piece good from the support surface for further transport into the storage facility, wherein the control device purposefully controls the handling device according to the information on position and orientation such that it takes hold of an individual piece good.

A separating device of the initially cited type is known, for example, from Offenlegungsschrift DE 10 2004 012 133 A1. The known separating device is used, in particular, for separately making available a large number of cuboid piece goods with highly diverse dimensions, particularly pharmaceutical packages that are initially situated in a receptacle bin, in such a way that these piece goods can be stored in an automated storage facility after the detection of their dimensions and after their identification. In the known device, for example, a step conveyor or a conveyor belt with cross webs successively conveys the packages out of the bin in an obliquely upward extending direction such that the packages pass over an upper edge of the step conveyor or of the conveyor belt and subsequently drop onto a support surface. The support surface is the upper side of a plate comprising a transparent or translucent material, for example glass. A digital camera arranged underneath the plate records an image, wherein the camera is focused such that it records the surface covered with the cuboid piece goods from below. Identifying information on the packages lying on the support surface, as well as their orientation and position, are determined from the thusly recorded image. The thusly determined data is used for controlling a gripper that takes hold of the packages from above and is able to remove and feed individual packages to the automated storage facility.

The disadvantages of the known separating device can be seen on the one hand in the relatively complicated image processing and on the other hand in errors in detecting the orientation and position that can occur due to a beam offset caused by the refraction of the light on the boundary surfaces of the glass plate.

In Utility Model DE 20 2004 015 264 U1, it is proposed to reduce the errors in detecting the orientation and position by utilizing a thin support (foil or cloth) that is partially transparent to light and on which the light passing through is at least in part diffusely scattered instead of a glass plate. It is proposed, for example, to utilize a support in the form of a taut cloth. It is also proposed to realize and arrange one or more light sources above the support such that the light of the light source or of the light sources is incident on the entire upper side of the support with the exception of the surface areas covered by the piece goods lying thereon in a diffuse fashion from all directions. The light is respectively reflected or scattered by a series of reflector or diffuser surfaces such that a minimum illuminance is present in every image section of the support with the exception of the surface areas covered by the bottom surfaces of the piece goods in nearly all conceivable arrangements of the piece goods on the support, i.e. such that particularly no perfect shadows can occur.

The disadvantage of the proposal of this utility model is the relatively complicated and unreliable structure of the support and the light sources. It was also determined that it is relatively complicated to respectively arrange the light sources and the diffuser and reflector surfaces in such a way that faulty detections of the position and orientation of several piece goods lying on the support are prevented.

Based on this prior art, the invention aims to develop a separating device with a relatively simple constructive design, in which the probability of incorrectly detecting and distinguishing adjacent piece goods lying on the support is reduced.

According to the invention, this objective is attained by means of a separating device with the characteristics of claim 1.

The invention is based on a device of the initially cited type. First of all, this device for separating piece goods to be stored in an automated storage facility features a conveying device for conveying piece goods from a stock onto a support surface of a collecting device. Such a conveying device may comprise, for example, a conveyor belt or—preferably—a step conveyor. The stock is kept, for example, in a bin. The separating device furthermore features a control device for controlling the conveying device, wherein this control device preferably comprises a computer. A sensor for detecting an imminent or actual impact of piece goods on the support surface is coupled to the control device. In this context, the term "imminent" impact of a piece good on the support surface also includes, for example, the detection of a piece good falling or dropping from an upper edge of the conveying device in the direction of the support surface of the collecting device. The control device interrupts the conveying of additional piece goods onto the support surface as soon as the (imminent or actual) impact of a piece good or several piece goods on the support surface has been detected. The sensor used may comprise, for example, a light barrier or a proximity sensor. The impact of several piece goods is detected, for example, when these piece goods are simultaneously or about simultaneously conveyed onto the support surface by the conveying device. The separating device furthermore features a detecting device that is coupled to the control device and serves for detecting the position and orientation of the piece goods lying on the support surface, wherein the detecting device features an image recording device such as, for example, a camera that records at least one image of the underside of the support surface of the collecting device and the control device obtains information on the position and orientation of the piece goods lying on the support surface from this image. In this context, the term "position and orientation" includes the location of the piece good lying on the support surface, as well as its orientation and its perpendicularly projected contour on the support surface. A handling device for removing a piece good from the support surface for further transport into the storage facility is coupled to the control device, wherein the control device purposefully controls the handling device according to the information on position and orientation such that it securely takes hold of an individual piece good. This handling device features, for example, a pair of gripper jaws or preferably a vacuum gripper. In this context, the term "securely" taking hold of refers to the piece good being secured from shifting in the handling device or from falling out of the gripping device.

According to the invention, a device of the initially cited type is characterized in that the detecting device features a light source that is arranged above the support surface and generates at least one luminous beam that is incident on the support surface in an exclusively perpendicular fashion, wherein the at least one luminous beam either covers the entire support surface to be detected or is moved such that it successively passes over the entire support surface to be detected, and in that the collecting device is realized in such a way that it transmits the light of the light source passing through the support surface and at the same time scatters or deflects this light of the light source at every point of the support surface such that at least part of the transmitted light is directed at the image recording device. For example, the collecting device features a material that transmits and at the same time diffusely scatters the light of the light source underneath the support surface. In this context, a "perpendicular" incidence of a luminous beam also refers to an incidence, in which the direction of incidence deviates from the perpendicular of the support surface by a small tolerable angle, for example, of a few degrees as it is the case, in particular, in the edge regions of a luminous beam with very low divergence.

The central idea of the invention is scanning the support surface with the aid of one or more luminous beams that are incident on the surface area of the support surface in a perpendicular fashion and originate from a light source, the distance of which from the support surface is greater than the greatest expected height of a piece good lying on the support surface such that a projection of the contour of the respective piece good can be realized. Such a design of the light source reliably prevents shadowing of small gaps between adjacent piece goods lying on the support surface and not only makes it possible to detect the contour of cuboid piece goods, but also the contour of cylindrical piece goods such as, for example, cans or bottles that lie on the support surface with their curved surface area.

In a preferred embodiment of the inventive device, the collecting device comprises a plane plate, the upper side of which forms the support surface. In this case, it would be conceivable that the plate is initially (in its normal position) not arranged horizontally, but rather inclined, i.e. sloped downward from the conveying device, such that the piece goods impacting on the support surface initially slide or roll down along the inclined plane. An actuator coupled to the control device is realized in such a way that it can rapidly move the plate into a horizontal position. As soon as the sensor has detected an impact of a piece good on the support surface and signaled this impact to the control device, the control device initiates a motion of the actuator such that the support surface is moved into the horizontal position and the sliding motion of the piece good is decelerated. The support surface is once again moved back into the inclined normal position after the removal of the piece good from the support surface.

The light source arranged above the support surface preferably generates a plurality of luminous beams that are incident on the support surface in an exclusively perpendicular fashion, wherein adjacent luminous beams are spaced apart from one another by no more than a maximum distance that corresponds to a desired resolution. This accelerates the scanning (or raster scanning) of the support surface.

According to a preferred enhancement of this embodiment of the inventive device, it is proposed that the light source is movable, wherein the luminous beams expose a strip that extends over the support surface in a first direction, and wherein the control device controls the movable light source in such a way that the exposed strip moves over the support surface in a second direction extending perpendicular to the first direction. In this context, "perpendicular" includes a tolerable angular deviation of a few degrees from the right angle. The preferred device allows a relatively simple line-shaped design of the light source, wherein the closely adjacent luminous beams expose a strip on the support surface. The light source is then moved over the support surface in the longitudinal direction like a scanner. In this context, the motion of the light source includes a motion of the light-emitting components themselves, as well as a motion of a beam deflecting mechanism (for example a reflector). The luminous beams forming the strip preferably are simultaneously incident on the support surface in a parallel fashion; however, it would also be conceivable that luminous beams are moved along the strip with high speed, wherein the scanning speed is significantly faster than the speed, with which the exposed strip is moved in the second direction.

In the context of this invention, any reference to the plate that carries the support surface transmitting and at the same time diffusely scattering the light of the light source refers to at least a substantial portion of the luminous radiation being transmitted through the plate and a substantial portion of this transmitted radiation being diffusely scattered. With respect to the operation of the inventive device, it is not important whether part of the light of the light source is reflected by the support surface or absorbed by the plate. It is likewise of minor importance whether the diffuse scattering actually is completely diffuse or a major portion of the light is less scattered.

According to a preferred embodiment of the inventive device, it is proposed that the image recording device records during the motion of the exposed strip a sequence of images of the underside of the support surface, from which a depiction of the support surface is produced, wherein the information on the position and orientation of the piece goods required for the activation of the handling device is obtained from said depiction, and wherein the time interval between the images corresponds to the time period, in which the exposed strip moves by a distance that approximately corresponds to the width of the strip. In this way, an image of the support surface is recorded in each position of the exposed strip, in which the strip is respectively shifted by its width. These images are assembled into an overall image with a suitable algorithm. Part of the processing can already be carried out in the image recording device. This assembly of image sequences could also be carried out if the light source does not generate an exposed strip, but rather an individual spot. In this case, a correspondingly larger number of images need to be assembled.

It would alternatively be conceivable that the image recording device records during the motion of the exposed strip a sequence of 20 to several hundred merely one-dimensional line-scan images that respectively extend in the first direction, wherein a depiction of the support surface is produced from said line-scan images and the information on the position and orientation of the piece goods required for the activation of the handling device is obtained from said depiction. In one embodiment of this alternative, for example, 20 to 50 line-scan images are recorded during the motion of the exposed strip in the second direction. The control device assembles these line-scan images into a depiction of the support surface, from which the information on the position and orientation of the respective piece goods lying on the support surface can be derived in a program-controlled fashion. Although this approach reduces the image data to be processed while simultaneously maintaining the required accuracy in determining the information that characterizes the position and orientation, it requires a coordination of the control of the motion of the light source with the process of assembling the strip images and therefore a measurement of the position of the exposed strip, as well as an increased control effort.

A preferred embodiment of the inventive separating device is characterized in that the light source is an infrared light source and the plate features a plastic that transmits and at the same time diffusely scatters the infrared light.

The infrared light source preferably comprises a plurality of infrared LEDs that are adjacently arranged on a substrate along the first direction and equidistantly spaced apart from one another, wherein each infrared LED emits a luminous beam with an aperture angle of less than 5°. It is preferred to use infrared LEDs with an aperture angle of 1 to 2°. The substrate consists, for example, of a printed circuit board, on which the LEDs are mounted. The distances between the LEDs correspond to the maximum distance between the luminous beams that is defined by the resolution. This maximum distance lies, for example, between 3 and 6 mm.

In a preferred embodiment of the inventive device, the infrared LEDs emit the luminous beams vertically downward and the substrate is movable in the second direction. In this embodiment, the luminous radiation sources themselves are moved in the second direction. In an alternative embodiment, for example, the infrared LEDs emit the luminous beams horizontally and a mirror arranged parallel to a stationary substrate of the LEDs deflects the horizontal luminous beams vertically downward and is arranged such that it can be moved in the second direction.

In a preferred embodiment of the inventive device, the first direction extends transverse to the transport direction of the conveying device, from which the piece goods arrive on the support surface. It is preferred that the strip formed by the vertical luminous beams is initially situated directly adjacent to the end of the conveying device. After the piece good or the piece goods have been transported onto the support surface, the exposed strip is moved over the piece goods in the second direction.

In an enhancement of the inventive device, the control device controls the movable light source in such a way that the exposed strip continuously moves over the entire support surface in one pass. The image recording device records a sequence of images within equidistant time intervals during this continuous motion of the strip. The recorded images are successively assembled in order to depict the support surface.

A preferred embodiment of the inventive separating device is characterized in that the handling device is suspended and guided on a linear guide that is mounted above the support surface and extends in the second direction, and in that the light source is suspended and guided on the same linear guide. This simplifies the constructive design of the separating device because a single linear guide can be used for guiding the handling device, as well as the light source. This embodiment takes advantage of the fact that the light source usually is initially guided over the support surface in order to detect the position and orientation of the piece goods lying thereon and then returned into its starting position at the edge of the support surface such that the linear guide is subsequently available for the transport of the handling device over its entire length. It would also be possible that the handling device and the light source utilize the same drive, wherein the handling device and the light source may even be connected to one another. This reduces the costs of the control.

Advantageous and/or preferred enhancements of the invention are characterized in the dependent claims.

The invention is described in greater detail below with reference to a preferred exemplary embodiment that is illustrated in the drawings. In these drawings:

FIG. 2 shows a schematic top view of the light source guided on the linear guides and of the support surface arranged underneath the light source.

Figure 1:
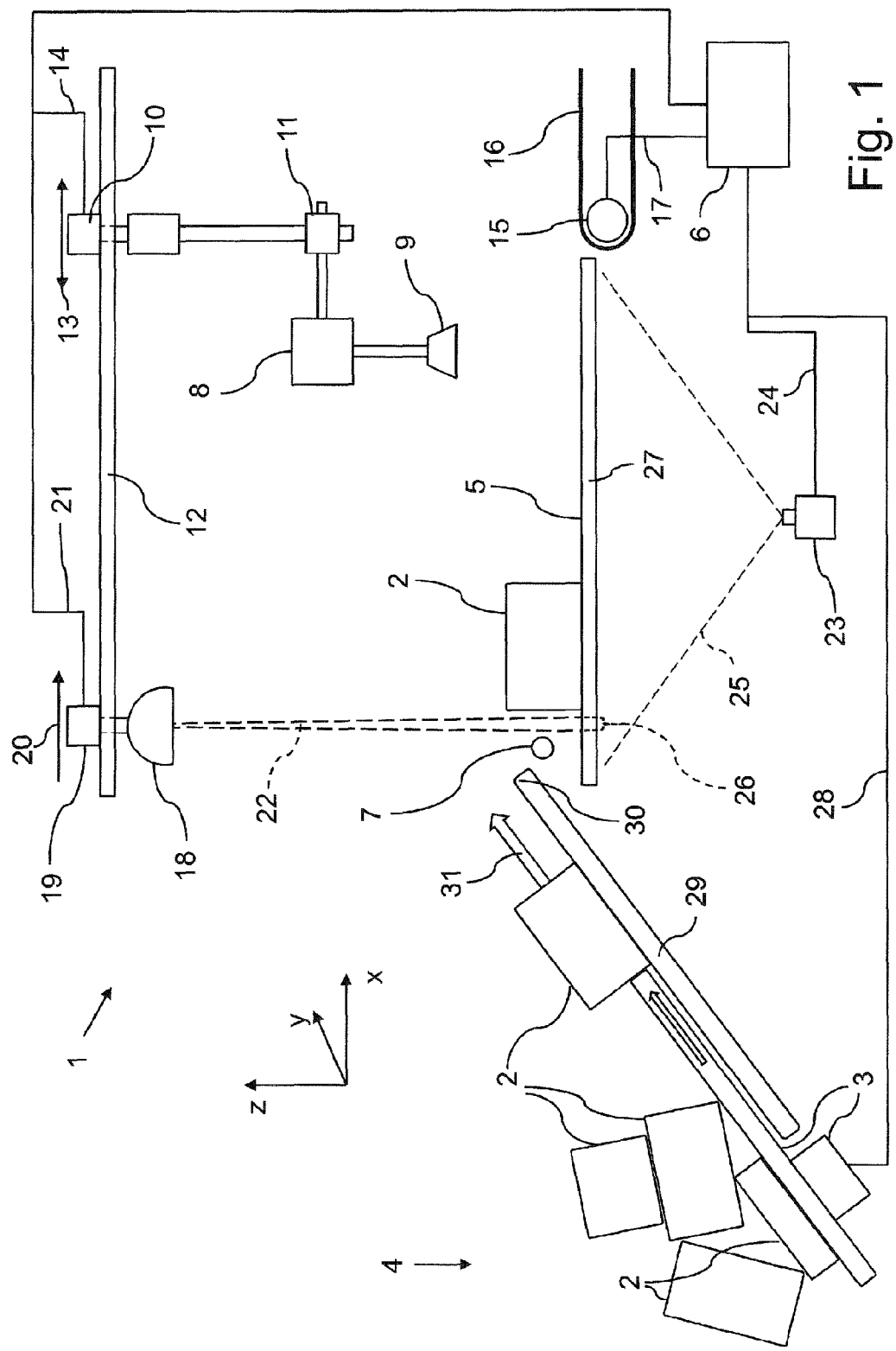
FIG. 1 shows a schematic structure of the inventive separating device.

FIG. 1 shows a schematic illustration of the inventive separating device 1. The separating device 1 comprises four main components, namely a conveying device 3 for conveying piece goods 2 from a stock 4 onto a support surface 5, a control computer 6, a detecting device that is coupled to the control computer 6 and serves for detecting the position and orientation (including the projected contour) of the piece goods 2 lying on the support surface 5, and a handling device that is coupled to the control computer 6 and serves for removing a piece good from the support surface 5 for further transport into the storage facility. The detecting device for detecting the position and orientation of the piece goods 2 lying on the support surface 5 comprises an image recording device 23 arranged underneath the support surface 5 and an infrared light source 18 arranged above the support surface 5, wherein the infrared light source 18 serves for exposing the support surface 5 and the image recording device 23 serves for recording the images produced during the exposure. These components and their functions are described in greater detail below.

A large number of piece goods with different shapes and different sizes, particularly pharmaceutical packages 2, are initially part of a stock 4 that may be kept, for example, in an open container or bin. The pharmaceutical packages 2 are conveyed obliquely upward from this stock 4 by means of a step conveyor 3. The step conveyor 3 comprises a support plate 29 with an upper edge 30. Above the support plate 29, a step with a conveying edge is moved from the bottom toward the top parallel to the support plate 29, wherein this motion of the step conveyor 3 is controlled by the control computer 6. FIG. 1 shows a connecting line 28 between the control computer 6 and a control drive of the step conveyor 3 that drives the step to be displaced upward. The motion of the step is indicated with a thin arrow. A pharmaceutical package 2 lying on the support plate 29 is pushed upward by the conveying edge of the step as indicated with the arrow 31. The pharmaceutical package 2 is pushed until it passes over the upper edge 30 and then drops or falls onto the support surface 5. This impact of the pharmaceutical package 2 on the support surface 5 is detected by a sensor 7 that may consist, for example, of a light barrier arranged parallel to the upper edge 30 of the step conveyor 3. However, it would also be conceivable to use other sensor arrangements such as, for example, tactile sensors. In this case, the width of the step conveyor 3 is chosen such that it is slightly smaller than the width of the support surface 5. Furthermore, the width is adapted to the expected size spectrum of the pharmaceutical packages 2. One or more pharmaceutical packages are pushed over the upper edge 30 of the support plate 29 by the conveying edge of the step during each upward displacement of the step from the stock toward the upper edge 30.

The support surface 5 is preferably formed by the upper side of a plane plate 27. In its normal position (that is not illustrated in FIG. 1), the plate 27 is initially inclined, i.e. sloped downward from the conveying device 3, such that piece goods 2 impacting on the support surface 5 initially slide or roll down an inclined plane. An actuator coupled to the control device 6 is realized in such a way that it can quickly move the plate 27 into a horizontal position. As soon as the sensor 7 has detected an (imminent) impact of a piece good 2 on the support surface 5 and signaled this impact to the control device 6, the control device 6 initiates a motion of the actuator such that the support surface 5 is moved into the horizontal position (illustrated in FIG. 1) and a sliding motion of the piece good 2 is decelerated. The support surface 5 is once again moved back into the inclined normal position after the removal of the piece good 2 from the support surface.

After the sensor 7 has detected the arrival of a pharmaceutical package 2 or the simultaneous arrival of several pharmaceutical packages 2 on the support surface 5 of the plate 27, the control computer 6 ensures that the step conveyor 3 does not convey any additional pharmaceutical packages 2, i.e. that its conveying step is retracted downward. The control computer 6 furthermore activates the detecting device for detecting the position and orientation of the pharmaceutical packages 2 lying on the support surface 5. For this purpose, the control computer 6 activates a drive 19 for the infrared light source 18 via the line 21, wherein said drive ensures that the infrared light source 18 moves in the direction of the arrow 20, i.e. in the x-direction. The motion of the infrared light source 18 preferably begins at the edge of the support surface 5 situated adjacent to the step conveyor 3 and then takes place continuously over the entire support surface 5 until it stops at the opposite edge. The infrared light source 18 with its drive 19 is suspended and guided on a linear guide 12.

The infrared light source 18 emits several luminous beams 22 that are arranged behind one another in the y-direction onto the support surface 5 such that these luminous beams 22 expose a narrow strip 26 extending in the y-direction. For example, an infrared light source 18 with a row of infrared LEDs 32 of the type illustrated in FIG. 2 is used for generating the several luminous beams 22. FIG. 2 shows a schematic top view of the detecting device of the inventive separating device 1. FIG. 2 shows the support surface 5, above which two linear guides 12 are arranged, wherein the infrared light source 18 is held and guided on said linear guides. In the example illustrated in FIG. 2, the infrared light source 18 features twenty infrared LEDs 32 that are arranged in a row along the y-direction. The control computer 6 activates the drive 19 of the infrared light source 18 in such a way that the infrared light source 18 moves over the support surface 15 in the x-direction with approximately constant speed, wherein the control computer 6 also ensures via the connecting lines 24 that the image recording device 23 records a predetermined number of images within approximately identical time intervals. For example, 20 to 400 images, preferably 40 to 80 images, are recorded during the motion of the infrared light source. The images of the underside of the support surface recorded during the motion of the exposed strip are assembled into a depiction of the support surface, from which the information on the position and orientation of the piece goods required for the activation of the handling device is obtained, wherein the time interval between the images corresponds to the time period, in which the exposed strip moves by a distance that corresponds to the desired image resolution. A complete image of the support surface is obtained in each position of the exposed strip, in which the strip is respectively shifted by the desired resolution. These images are assembled into an overall image with a suitable algorithm. Part of the processing may already be carried out in the image recording device 23.

The support surface 5 comprises the upper side of a plastic plate 27 that is transparent to the emitted infrared light and diffusely scatters this infrared light while it passes through the plastic plate. Due to this diffuse scattering, the infrared light reaches the camera 23 regardless of the current position of the exposed strip 26 on the support surface 5. If a section of the support surface 5 is covered by a pharmaceutical package 2 lying thereon while the exposed strip moves over the support surface, the images recorded by the camera 23 while the exposed strip moves over the pharmaceutical package 2 contain unexposed areas in the y-coordinate regions that are covered by the pharmaceutical package 2. The control computer 6 calculates the position coordinates of the pharmaceutical packages 2 lying on the support surface from the sequence of images of the camera 23, in which unexposed areas are respectively recorded while the strip moves over the pharmaceutical package 2.

After the control computer 6 has calculated the position and orientation of the pharmaceutical packages 2 lying on the support surface 5 based on the image signals arriving from the camera 23, it can utilize these coordinates for activating a handling device that respectively picks up one individual package 3 from the support surface 5 and deposits this package onto a conveyor belt 16, wherein the conveyor belt 16 delivers the pharmaceutical package 2 into the gripping range of a storage and retrieval unit of an automated high-bay storage facility (that is not illustrated in FIG. 1). For this purpose, the control computer 6 is coupled to the handling device 8 to 11 via the line 14. It is furthermore coupled to the drive 15 of the conveyor belt 16 via the line 17.

The handling device is held and guided by the linear guide 12 and features a drive 10 that can move the handling device in the direction of the arrow 13. In the exemplary embodiment illustrated in FIG. 1, the handling device features a suction head 9, the suction of which causes the upper side of a pharmaceutical package 2 lying on the support surface 5 to attach itself to the handling device such that the pharmaceutical package 2 can be lifted off the support surface 5. The suction head 9 is controlled by a drive situated in the box 8. The handling device features a second drive 11 that is guided on a vertical rail in order to move the suction head 9 in the vertical direction. Furthermore, an additional drive is provided for moving the suction head 9 in the y-direction. Consequently, the suction head 9 can be moved in all three directions in space. Based on the determined position coordinates, the control computer 6 ensures that the suction head 9 attaches to a predetermined location on the upper side of the pharmaceutical package 2, at which the pharmaceutical package 2 can be securely taken hold of. The pharmaceutical package 2 attached by means of suction is then lifted off the support surface 5 and deposited onto the conveyor belt 16.

Another advantage of the embodiment of the inventive separating device 1 illustrated in FIG. 1 can be seen in that the linear guide 12 carries the movable infrared light source 18 with its drive 19, as well as the handling device. At the beginning of a separating cycle, the infrared light source 18 is situated in the edge position illustrated on the left in FIG. 1 while the handling device is situated outside the support surface 5 at the right edge of the linear guide 12, for example above the conveyor belt 16. In a conventional process sequence, the support surface 5 is initially scanned by the infrared light source 18, wherein the infrared light source 18 can be moved along the linear guide 12 without colliding with the handling device. After the scanning process, the infrared light source 18 is once again displaced to the left edge of the linear guide 12 such that the entire linear guide 12 is now available for the motion of the handling device.

The invention claimed is:

1. A separating device, comprising:
a conveyor configured to transfer piece goods from a stock to a support surface of a collector;
a controller configured to control the conveyor;
a sensor that is coupled to the controller and detects an imminent or actual impact of piece goods on the support surface, wherein the controller is further configured to interrupt a conveying of additional piece goods onto the support surface as soon as an impact of a piece good or several piece goods has been detected;
a detector that is coupled to the controller and serves for detecting a position and an orientation of the piece goods lying on the support surface, wherein the detector comprises an imager configured to record images of an underside of the support surface of the collector and the controller is further configured to obtain information on the position and orientation of the piece goods lying on the support surface from said images; and
a handler that is coupled to the controller and serves for removing a piece good from the support surface for further transport into a storage facility, wherein the controller is configured to control the handler according to the information on position and orientation such that it takes hold of an individual piece good, wherein:
the detector comprises a light source that is arranged above the support surface and generates at least one luminous beam that is incident on the support surface in a transverse fashion,
the at least one luminous beam either covers the support surface to be detected or is moved such that it successively passes over the support surface to be detected,
the collector transmits light of the light source passing through the support surface and scatters or deflects this light of the light source at every point of the support surface such that at least part of the light is directed at the imager,
the light source arranged above the support surface generates multiple luminous beams that are transversely incident on the support surface, and that are spaced apart by a pre-selected resolution,
the light source is movable, and the luminous beams expose a strip that extends over the support surface in a first direction, and
the controller is further configured to move the light source over the support surface in a second direction extending transverse to the first direction.

2. The separating device according to claim 1, wherein a material of the collector underneath the support surface transmits and diffusely scatters the light of the light source.

3. The separating device according to claim 1, wherein the collector comprises a plate, an upper side of which forms the support surface.

4. The separating device according to claim 1, wherein the imager is further configured to record an image during a motion of the strip a sequence of images of the underside of the support surface, from which a depiction of the support surface is produced, wherein the information on the position and orientation of the piece goods required for an activation of the handler is obtained from said depiction, and wherein a time interval between the images corresponds to a time period, in which the strip moves by a distance that approximately corresponds to a width of the strip.

5. The separating device according to claim 3, wherein the light source is an infrared light source and the plate features a plastic that transmits and diffusely scatters an infrared light from the infrared light source.

6. The separating device according to claim 1, wherein the light source comprises a plurality of LEDs that are adjacently arranged on a substrate along a first direction (y) and equidistantly spaced apart from one another, wherein each LED emits a luminous beam with an aperture angle of less than 5°.

7. The separating device according to claim 6, wherein the plurality of LEDs emit the luminous beams vertically downward and the substrate is movable in a second direction (x).

8. The separating device according to claim 6, wherein the plurality of LEDs emit the luminous beams horizontally and a mirror arranged parallel to a stationary substrate of the plurality of LEDs deflects the luminous beams vertically downward and is arranged such that it can be moved in a second direction (x).

9. The separating device according to claim 1, wherein the first direction (y) extends transverse to a transport direction of the conveyor, from which the piece goods arrive on the support surface.

10. The separating device according to claim 1, wherein the controller is further configured to control the light source in such a way that the strip continuously moves over the support surface in one pass.

11. The separating device according to claim 1, wherein the handler is suspended and guided on a linear guide that is mounted above the support surface and extends in the second direction (x), and the light source is suspended and guided on the linear guide.

12. A separating device for separating piece goods to be stored in a storage facility, comprising:
a conveyor configured to transfer piece goods from a stock to a support surface of a collector;
a controller configured to control the conveyor;
a sensor that is coupled to the controller and detects an imminent or actual impact of a piece good on the support surface, wherein the controller interrupts a conveying of additional piece goods onto the support surface in response to detection of an impact;
a detector coupled to the controller, the detector configured to detect a position and orientation of the piece good lying on the support surface, wherein the detector comprises an imager configured to record images of an underside of the support surface of the collector and the controller is further configured to obtain information on the position and orientation of the piece good lying on the support surface from said images; and a handler, coupled to the controller, the handler configured to remove a piece good from the support surface for further transport to the storage facility, wherein the controller is further configured to control the handler based on the information on position and orientation, wherein the detector comprises, above the support surface, a light source that generates multiple light beams that are transversely incident on the support surface, the light beams cover the support surface to be detected, the light source is movable, and the light beams expose a strip that extends over the support surface in a first direction, and the collector transmits light of the light source passing through the support surface and scatters or deflects this light such that at least part of the light is directed at the imager.

13. The separating device according to claim 12, wherein the light beams are spaced apart from one another by no more than a maximum distance that corresponds to a pre-selected resolution.

14. The separating device according to claim 12, wherein the collector comprises a plate, an upper side of which forms the support surface, and wherein the light source comprises an infrared light source and the plate features a material that transmits and diffusely scatters infrared light.

15. A separating device for separating piece goods to be stored in a storage facility, comprising:
   a conveyor configured to transfer piece goods from a stock to a support surface of a collector;
   a controller configured to control the conveyor;
   a sensor that is coupled to the controller and detects an imminent or actual impact of a piece good on the support surface, wherein the controller interrupts a conveying of additional piece goods onto the support surface in response to detection of an impact;
   a detector, coupled to the controller, the detector configured to detect a position and orientation of the piece good lying on the support surface, wherein the detector comprises an imager that records images of an underside of the support surface of the collector and the controller is further configured to obtain information on the position and orientation of the piece good lying on the support surface from said images; and
   a handler, coupled to the controller, the handler configured to remove a piece good from the support surface for further transport to the storage facility, wherein the controller controls the handler based on the information on position and orientation,
   wherein the detector comprises a light source above the support surface that generates at least one light beam that is perpendicularly incident on the support surface,
   wherein the at least one light beam is moved such that it successively passes over the support surface to be detected, and
   wherein the collector transmits light of the light source passing through the support surface and scatters or collects this light such that at least part of the light is directed at the imager.

16. The separating device according to claim 15, wherein the light source above the support surface generates a plurality of light beams that are perpendicularly incident on the support surface, wherein adjacent luminous beams are spaced apart from one another by no more than a maximum distance that corresponds to a pre-selected resolution.

17. The separating device according to claim 16, wherein the light source is movable, wherein the plurality of light beams expose a strip that extends over the support surface in a first direction (y), and wherein the controller is configured to control the light source such that the strip moves over the support surface in a second direction (x), extending perpendicular to the first direction (y).

18. The separating device according to claim 16, wherein the light source comprises a plurality of LEDs that are adjacently arranged on a substrate along a first direction (y) and equidistantly spaced apart from one another, wherein each LED emits a luminous beam with an aperture angle of less than 5°.

* * * * *